UNITED STATES PATENT OFFICE.

NICHOLAS M. GOODLETT, JR., OF SOUTH ORANGE, NEW JERSEY, ANCILLARY EXECUTOR OF JOHN FORDRED, DECEASED, ASSIGNOR TO THE CONDENSED EGG SYNDICATE, LIMITED, OF LONDON, ENGLAND.

PROCESS OF PRESERVING EGG CONTENTS.

SPECIFICATION forming part of Letters Patent No. 692,268, dated February 4, 1902.

Application filed September 25, 1901. Serial No. 76,448. (No specimens.)

*To all whom it may concern:*

Be it known that I, NICHOLAS M. GOODLETT, Jr., a citizen of the United States, residing in South Orange, county of Essex, State of New Jersey, am the ancillary executor of the last will and testament of JOHN FORDRED, deceased, late of 48 Lausanne road, Peckham, county of Surrey, England, who invented a new and useful Improved Process of Treating Egg Contents, of which the following is a specification.

The present invention relates to an improved process of treating the contents (white and yolk) of eggs so that they may be preserved for an indefinite time.

Hitherto a process for producing a preserved-egg compound has been performed as described in the specification of British Letters Patent No. 15,762 of 1893, in which the contents of the eggs—that is to say, the white and the yolk—have been treated, either together or separately, by being mixed with a proportion of sugar from fifty per cent. to sixty-six per cent. of the weight of such egg contents and heated to a temperature from 145° to 165° Fahrenheit for a time of about five hours, the weight of the mixture being then reduced about thirty per cent. by evaporation of water, whereupon the product was strained, so as to separate the liquid or viscid portion from the undissolved or solid matters.

The process according to the present invention differs from the above in using a much larger proportional quantity of sugar, in heating to a much higher temperature, in greatly diminishing the duration of the heating, in reducing the amount of evaporation, and in dispensing with the straining of the product, which by the improved process is wholly fluid or viscid.

It has been discovered that by using an extra quantity of sugar—say up to one hundred per cent. of the weight of the egg contents treated at one time—the temperature may be raised proportionately (or practically so) to the percentage of sugar used and that the use of one hundred per cent. of sugar permits the temperature to be raised to 200° Fahrenheit without coagulating the albumen of the egg contents. This increased range of temperature has this important practical effect—viz., that it enables the process to be carried out at a temperature much higher than was previously possible—say 185° Fahrenheit—still leaving a margin which will save the batch from being spoiled by coagulation in case of an accidental rise of temperature during the carrying out of the process, the exact temperature at which gelatinization takes place differing (as was stated in specification No. 15,762 of 1893) with different eggs. The increase in the temperature has another curious effect, as, in conjunction with the extra sugar, it dissolves the whole of the egg contents, and thus obviates the necessity for straining, by which means one operation in the former process is avoided, thus saving time, trouble, and waste and increasing the strength of the product. The extra sugar also renders it possible to reduce the amount of the water removed, it being found that a reduction of the weight by only some ten per cent. to fifteen per cent. will serve the same purpose as the thirty per cent. before mentioned. For commercial purposes this is a point of some moment, as a product is thereby obtained which can be used without further manipulation when it gets into the hands of the consumer and the keeping qualities of which are of a high character. The time occupied in carrying on the heating process is only about one hour, as against the five hours mentioned in the previous patent.

By the term "sugar" is intended any of the sugars previously used in the process before referred to.

What is claimed is—

1. The improved process of treating egg contents consisting in mixing them with from sixty-six to one hundred per cent. of sugar and heating the mixture to a temperature exceeding 165° and not exceeding 200° Fahrenheit for about one hour.

2. The improved process of treating egg contents consisting in mixing them with from sixty-six to one hundred per cent. of sugar and heating the mixture to a temperature exceeding 165° and not exceeding 200° Fahrenheit until water has been evaporated equal to between ten per cent. and fifteen per cent. of the weight of the mixture.

NICHOLAS M. GOODLETT, JR.

Witnesses:
CHAS. C. KEMMLEIN,
CHARLES W. BRANDT.